US012799981B2

(12) United States Patent
Ozdemir et al.

(10) Patent No.: US 12,799,981 B2
(45) Date of Patent: Nov. 17, 2026

(54) REMOVABLE BEARING HOLDER

(71) Applicant: Tusas—Turk Havacilik Ve Uzay Sanayii Anonim Sirketi, Kahramankazan (TR)

(72) Inventors: Merve Ozdemir, Kahramankazan (TR); Erkan Karacaoglu, Kahramankazan (TR); Durukan Tamkan, Kahramankazan (TR)

(73) Assignee: Tusas—Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 105 days.

(21) Appl. No.: 18/963,605

(22) Filed: Nov. 28, 2024

(65) Prior Publication Data

US 2025/0207636 A1 Jun. 26, 2025

(30) Foreign Application Priority Data

Dec. 25, 2023 (TR) ............................... 2023/018273

(51) Int. Cl.
*F16C 35/077* (2006.01)

(52) U.S. Cl.
CPC ........ *F16C 35/077* (2013.01); *F16C 2226/60* (2013.01); *F16C 2226/70* (2013.01); *Y10T 29/49696* (2015.01); *Y10T 29/49698* (2015.01)

(58) Field of Classification Search
CPC ................ F16C 35/077; F16C 2226/60; F16C 2226/70; Y10T 29/49696; Y10T 29/49698
See application file for complete search history.

(56) References Cited

U.S. PATENT DOCUMENTS

| | | | | | |
|---|---|---|---|---|---|
| 2,538,229 | A * | 1/1951 | Boden | F16C 25/08 | 384/611 |
| 2,592,387 | A * | 4/1952 | Brown | F16C 33/7846 | 384/480 |
| 3,080,199 | A * | 3/1963 | Rickley | F16C 13/02 | 384/584 |
| 6,029,538 | A * | 2/2000 | Little | F16F 15/3156 | 384/903 |
| 9,366,296 | B2 | 6/2016 | Abrudan et al. | | |
| 9,976,599 | B2 | 5/2018 | Richardson et al. | | |
| 2004/0111889 | A1* | 6/2004 | Wolf | F16C 19/385 | 29/898.07 |
| 2018/0057151 | A1* | 3/2018 | Jaber | F16C 19/548 | |

FOREIGN PATENT DOCUMENTS

| | | | | |
|---|---|---|---|---|
| EP | 1473570 | A1 * | 11/2004 | F16C 35/045 |
| FR | 2535815 | A1 * | 5/1984 | F16C 33/80 |

* cited by examiner

*Primary Examiner* — Phillip A Johnson

(57) ABSTRACT

A removable bearing holder for mounting a bearing in a gap of a body. The holder includes a body cylindrical part received in the gap, a body outer thread on an outer wall of the body cylindrical part, and a body inner thread on an inner wall of the body cylindrical part. An outer locknut engages the body outer thread and an inner locknut engages the body inner thread to fix the bearing in the direction in which the gap extends. A ring-shaped washer is located between the outer locknut and the inner locknut and provides friction between them to resist loosening. The washer has outer nut protrusions bent into slots of the outer locknut and inner nut protrusions bent into slots of the inner locknut. The holder permits repeated mounting and demounting of the bearing without damaging the bearing or the body.

13 Claims, 5 Drawing Sheets

REMOVABLE BEARING HOLDER

RELATED APPLICATION

This application claims the benefit of priority of Turkish Patent Application No. 2023/018273, filed on Dec. 25, 2023, the contents of which are incorporated by reference as if fully set forth herein in their entirety.

FIELD AND BACKGROUND OF THE INVENTION

The present invention relates to a removable bearing holder which prevents bearings from being damaged during mounting/demounting, designed for situations where bearings need to be frequently mounted/demounted.

Bearings enable machine elements that need to be supported to operate with low friction. In order for bearings to operate effectively at high efficiency, they must be integrated into the system in which they will be mounted in a manner appropriate to the system. In order for bearings to be mounted, methods such as mounting with heating/cooling and mounting with pressing are generally used. However, in the mounting with heating and cooling method, long mounting times are required, and efficient mounting cannot be achieved as a result of the mounting. In the mounting by pressing method, the bearing and/or the component to which it will be mounted may be damaged. A removable bearing holder is needed for high efficiency mounting of bearings without damage during mounting, especially for working conditions requiring frequent mounting/demounting, without damaging the bearing and providing fast mounting/demounting.

In the United States patent document numbered U.S. Pat. No. 9,366,296 in the state of the art, a design for the maintenance and replacement of bearings on an aircraft is mentioned.

The invention comprises a bearing with a replaceable ring, which has a flange for coupling with the housing at one end and an outer ring with an annular threaded section at the other end. Said threaded section receives a fastening element such as a fastening nut that mates with the housing. In addition, the housing has an annular protrusion concentric with the threaded section at the second end. This protrusion rides on the threaded part and can be bent by increasing its diameter to lock the retaining element securely in place. The curved protrusion prevents the retaining element from loosening over time, thus increasing the operating life of the bearing. A method for the fixed attachment of the retaining element to the bearing by placing a replaceable bearing body, a forged bearing body and the bearing in a housing and screwing the retaining element onto the bearing is mentioned. The ring-shaped protrusion is pressed onto the retaining element.

In the United States patent document numbered U.S. Pat. No. 9,976,599 in the state of the art, a countersunk threaded bearing and the method of installation are disclosed. The bearing assembly is designed to simplify assembly to a structural component by eliminating the need for interference fit or stacking. The assembly consists of an outer race, an inner race, a bearing interface, and a nut. The outer race has a head end that has a flange having a countersink lip formed on an underside of the flange. The outer race includes an externally threaded portion terminating at the base end. The inner race is circumscribed by the outer race and the bearing interface is located between and rotatably couples the inner race to the outer race. The nut is configured to engage with threads to the externally threaded portion by securing the bearing assembly to the structural hole. The nut is screw-fitted to the externally threaded portion that protrudes from the rear of the structural component.

A removable bearing holder developed with the present invention provides removable mounting for effective operation of the bearings at high efficiency.

Another aim of this invention is to perform the mounting/demounting of the bearing without damaging the bearing or the component to which the bearing will be attached.

Another aim of this invention is to develop a removable bearing holder system that can be quickly and easily mounted/demounted, especially for areas of use where a large number of repeated mounting/demounting operations are required.

SUMMARY OF THE INVENTION

The removable bearing holder defined in the first claim and the claims dependent on this claim, which is realised to achieve the aim of the invention, is attached to the body. The body is a structural part that is located on the aircraft. A hole is drilled into the body by the manufacturer and an opening is opened. The opening is opened in a way that it is almost completely perpendicular to the body surface. The dimensions of the body inner diameter and the body outer diameter are almost equal. The body has a body cylindrical part that is almost completely cylindrical. The body cylindrical part is in the form of a hollow cylinder with a wall thickness. The bearing is attached to the body cylindrical part. The outer surface of the bearing and the inner surface of the body cylindrical part are almost completely in contact. There is a male thread on the outer surface of the cylindrical body at the end farthest from the bearing. The threads extend in a helical form and form recesses on the body. There is a female thread on the outer locknut. There is a thread consisting of helical-shaped recesses on the inner wall of the outer locknut in a cylindrical form. The aforementioned threads are mounted with the outer thread of the body and are connected to each other by rotating.

The removable bearing holder, which is the subject of the invention, has a body inner thread, which is located on the inner wall of the cylindrical body and is a female thread. The inner thread is located on the end of the body that is far from the bearing. The inner locknut is cylindrical in form and there is a male thread on the outer wall of the cylindrical part. The male thread on the inner locknut is rotated and mounted to the inner thread. The inner locknut almost completely contacts the bearing and fixes the bearing in a vertical plane downwards. The washer is compressed between the outer locknut and the inner locknut. The washer acts as an extra friction surface and provides extra friction to the outer locknut and the inner locknut.

In one embodiment of the invention, the removable bearing holder comprises an outer locknut main body that has a wall thickness and is almost completely hollow in cylindrical form. The outer locknut has multiple outer locknut slots that are radially equally spaced around its axis. The inner locknut has a cylindrical part which is a cylindrical part with a wall thickness and almost completely hollow. The inner locknut flange is in a cylindrical form with a diameter larger than the inner locknut cylindrical part and extends laterally from the inner locknut cylindrical part. The inner locknut has a plurality of inner locknut slots that are radially equally spaced around its axis. The inner locknut slots are provided as gaps. The washer inner nut protrusions are bent by the manufacturer to almost completely contact the inner locknut slot. The outer locknut has a plurality of outer locknut slots that are equally spaced radially around its axis. The outer locknut slots are provided as gaps. The outer washer nut protrusions are bent by the manufacturer and almost completely contacted with the outer locknut slot. While only one of the inner washer locknut protrusions and outer washer locknut protrusions can be bent to one inner locknut slot and outer locknut slot, respectively, more than one inner washer locknut protrusion and outer washer locknut protrusions can be bent to more than one inner locknut slot and outer locknut slot, respectively, according to different requirements. The inner locknut protrusion, which is positioned at almost the same degree within three hundred and sixty degrees around the body's own axis, and thus reciprocated or aligned, is bent to the inner locknut slot, and the outer locknut protrusion is bent to the outer locknut slot.

In one embodiment of the invention, there is an outer locknut thread with a female thread on the wall of the removable bearing holder outer locknut main body that faces the gap. There is an outer locknut thread that is threaded in the same direction as the body outer thread and mounted with each other by means of threads. The body outer thread and the outer locknut thread can be opened in the right or left thread direction according to the manufacturer's preference. There is an inner locknut thread consisting of a male thread on the wall of the cylindrical part of the inner locknut facing the body. The inner locknut thread and the body inner thread are mounted to each other by means of threads. The thread direction of the inner locknut thread is in the opposite direction to the thread direction of the outer locknut thread. In addition, the body outer thread and the body inner thread have threads opened in opposite directions.

In one embodiment of the invention, the removable bearing holder comprises a washer that is not yet mounted in the first position (I). In the first position (I), the washer has not been subjected to any bending process by the manufacturer and is a standard washer with protrusions. The manufacturer bends the washer protrusions in the second position (II) upon their placement in the slots they belong to. Thus, in the second position (II), the removable bearing holder is functionally operational. While the first position (I) refers to the situation where the mounting has not yet taken place, the second position (II) refers to the position where the washer protrusions are bent into the slots where they are opposite each other and the removable bearing holder is functionally operational.

In one embodiment of the invention, the removable bearing holder has more than one washer intermediate protrusion on the washer, which are bent towards the main body of the outer locknut in the second position (II), creating an extra friction moment between the outer locknut and the inner locknut and providing a rotational moment in the opposite direction against loosening. The washer intermediate protrusions contribute to the effective transmission of force between the outer locknut and the inner locknut.

In one embodiment of the invention, the removable bearing holder has an outer thread, which is a male thread, on the body cylindrical part at its end where the inner locknut and the outer locknut are mounted to the body. At the end where the inner locknut and the outer locknut are mounted to the body. there is a body inner thread that is located on the body cylindrical part and is a female thread. The body outer thread is located on the outer wall of the body, while the body inner thread is located on the inner wall of the body.

In one embodiment of the invention, the removable bearing comprises inner locknut slots located sequentially along the circumference of the retaining washer. The inner locknut slots have outer nut protrusions that are located in spaces predetermined by the manufacturer between them, almost completely contacting the outer locknut main body and the inner locknut flange, thus creating extra friction force.

In one embodiment of the invention, the removable bearing holder body has a body inner flange that is located on the wall of its cylindrical part facing the body, is an extension extending towards the gap, and at least partially contacts the bearing and ensures that the bearing is fixed upwards in the gap.

In one embodiment of the invention, the removable bearing holder body has a body outer flange that is located on the body and is mounted on the body, extending from the body towards the body and forming a protrusion form. The body outer flange is seated on the body.

In one embodiment of the invention, the bearing is placed in the gap in the removable bearing holder. The outer locknut thread is rotated around the axis it extends along, and the outer locknut thread is attached to the body outer thread. The bearing is attached so that it rests on the body inner flange. The washer is positioned on the outer locknut. The inner locknut thread is rotated around the axis it extends along, and it is attached to the body inner thread. The outer nut protrusion of the washer is bent into the outer locknut slot it is aligned with. The inner nut protrusion of the washer is bent into the inner locknut slot it is aligned with. In this way, the bearing is safely mounted into the body.

In one embodiment of the invention, the removable bearing holder has a limiter that is in a form conjugate with the body outer flange, is placed on the body and prevents the body from rotating around the direction it extends along. The limiter is attached to the body by means of a connector. The number of connectors may vary according to the rotational moment that the limiter must meet.

In one embodiment of the invention, the removable bearing holder has a body outer flange facing the body and chamfered at its end on the body inner flange side.

In one embodiment of the invention, the removable bearing holder is mounted in such a way that the body cylindrical part has a gap-fitting mounting relationship to the body. The outer diameter of the body cylindrical part and the diameter of the gap are almost equal.

BRIEF DESCRIPTION OF THE SERVAL VIEWS OF THE DRAWINGS

The removable bearing holder realised to achieve the aim of this invention is shown in the attached figures, and of these figures.

DESCRIPTION OF SPECIFIC EMBODIMENTS OF THE INVENTION

The parts in the figures are numbered one by one and the equivalents of these numbers are given below.

Figure 1:
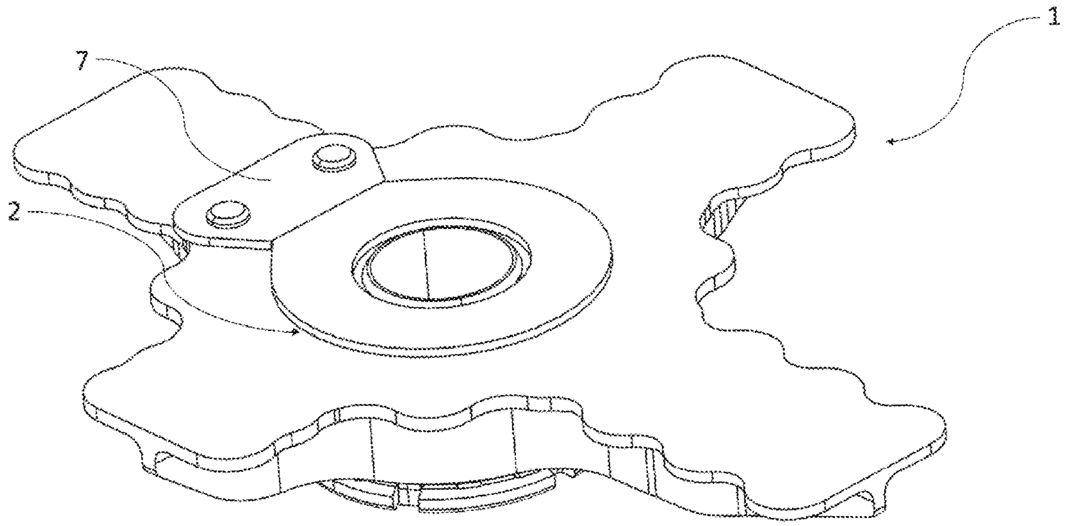
FIG. 1 shows the perspective view of a removable bearing holder.
Figure 2:
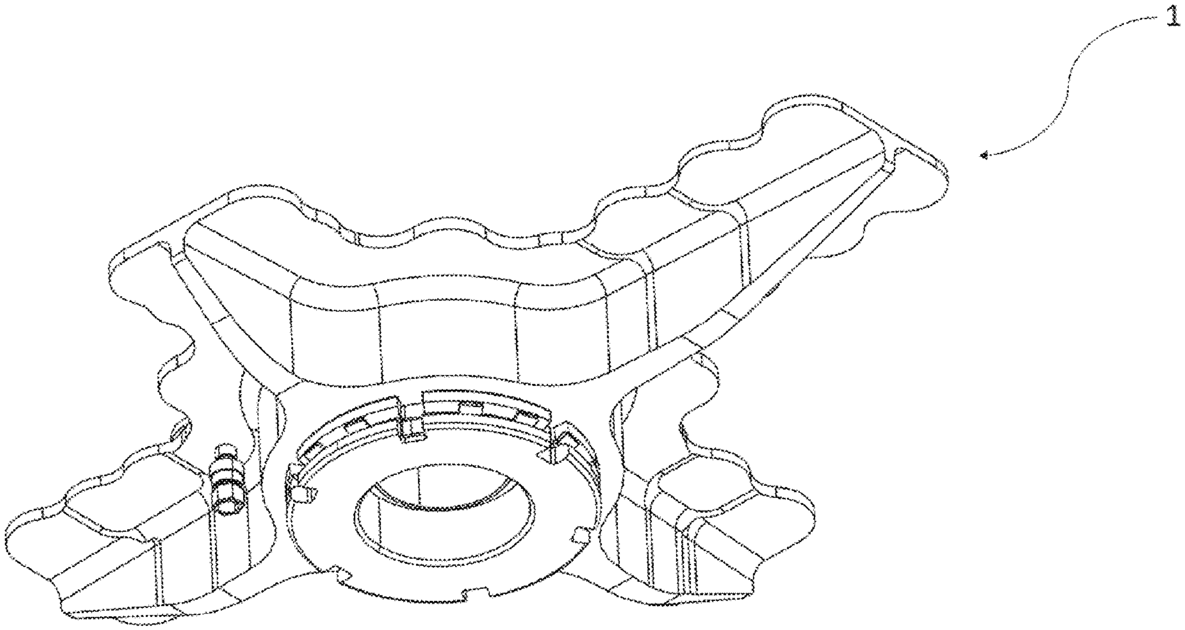
FIG. 2 shows the perspective view of a removable bearing holder.

1. Removable Bearing Holder
2. Body
  210. Body Cylindrical Part
  220. Body Outer Thread
  230. Body Inner Thread
  240. Body Inner Flange
  250. Body Outer Flange
3. Bearing
4. Outer Locknut
  410. Outer Locknut Main Body
  420. Outer Locknut Slot
  430. Outer Locknut Thread
5. Inner Locknut
  510. Inner Locknut Cylindrical Part
  520. Inner Locknut Flange
  530. Inner Locknut Slot
  540. Inner Locknut Thread
6. Washer
  610. Washer Main Body
  620. Washer Outer Nut Protrusion
  630. Washer Inner Nut Protrusion
  640. Washer Intermediate Protrusion
7. Limiter
(D) Surface
(H) Gap
(I) First Position
(II) Second Position The removable bearing holder (1) comprises a body (D), a gap (H) that is an opening on the body (D), a body (2) which is almost completely cylindrical in form and is located inside the gap (H) and is form-compatible with the body (D), a body cylindrical part (210) which is the part of the body (2) that is almost completely hollow cylindrical in form, a bearing (3) that is located inside the gap (H) and is mounted on the body (2) in a way that it will come into contact with the body cylindrical part (210) all around and provides bearing, at least one body outer thread (220) having helical recesses on the outer wall of the body (2), and an outer locknut (4) which is mounted on the body outer thread (220) in a removable manner by rotating the helical recesses located on it (FIGS. 1, 5).

Figure 5:
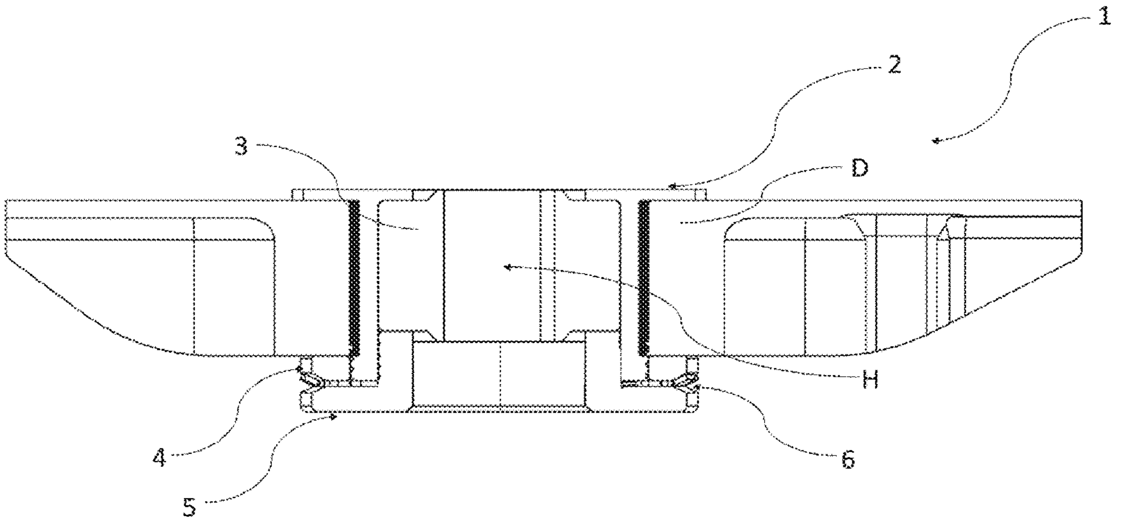
FIG. 5 shows the sectional view of a removable bearing holder.
Figure 6:
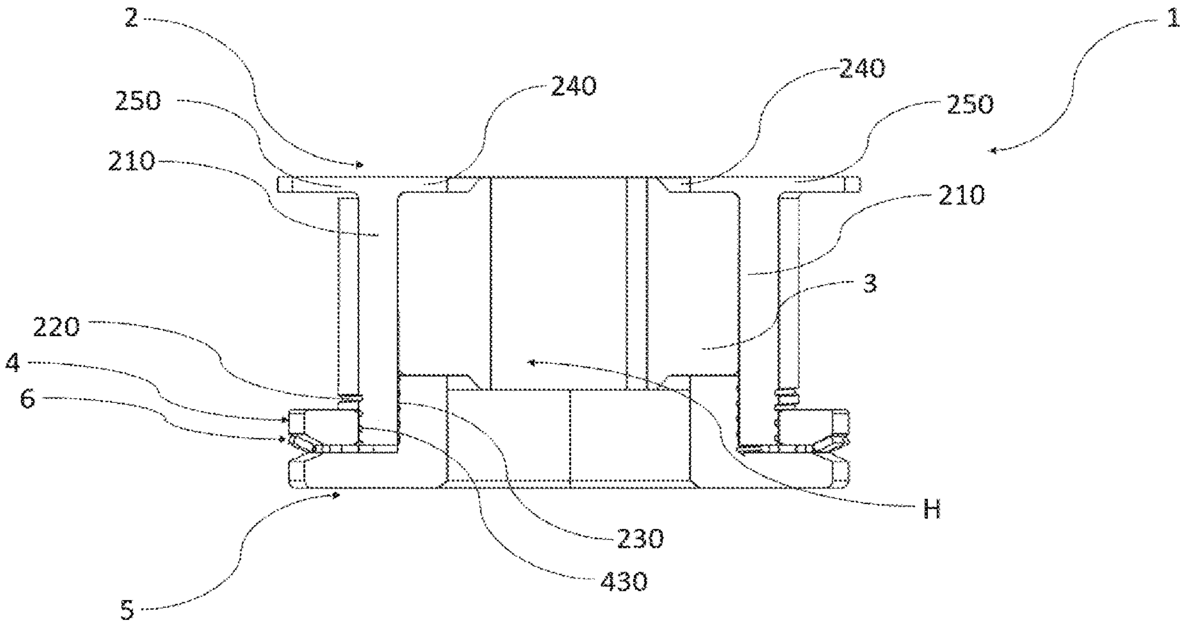
FIG. 6 shows the sectional view of body, bearing, inner locknut, outer locknut, and washer.

The removable bearing holder (1) which is the subject of the invention comprises at least one body inner thread (230) having helical recesses located on the inner wall of the body (2) facing each other with the body (2) wall, an inner locknut (5) the helical recesses on which are attached to the body inner thread (230) by rotating them around themselves in a removable manner, thus fixing the bearing (3) in the direction where the gap (H) extends along, and at least one washer (6) that is in the form of a ring, is located between the outer locknut (4) and the inner locknut (5), and thereby ensures the effective operation of the outer locknut (4) and the inner locknut (5) (FIGS. 5, 6).

Bearings (3) used in flight critical parts such as landing gear connection parts need to be replaced when damaged. Damage to the connection part slots during demounting/removal may require connection part replacement. In large connection parts, instead of replacing large connection parts, the removable bearing provides advantages in terms of time and operation. In the state of the art, bearings are mounted to the body (D) where they will be mounted by plastering or tight-fitting methods. However, the slot may be damaged in parts that receive high loads during demounting/removal. In such cases, the use of a removable bearing holder (1) ensures that demounting/mounting operations are carried out without any damage to the body (D). The outer locknut (4) contacts the body (2) through the body outer thread (220). The parts remaining on the outer side of the outer locknut (4) are almost completely in contact with the body (D). In this way, the outer locknut (4) ensures that the body (2) is fixed to the body (D) (FIG. 5).

On the inner surface of the cylindrical body (2), there is a body inner thread (230) consisting of helical recesses. There is a male thread on the inner locknut (5), and said male thread is rotated and attached to the body inner thread (230). There is a washer (6) between the outer locknut (4) and the inner locknut (5). The washer (6) causes additional friction between the outer locknut (4) and the inner locknut (5). In this way, the resistance of the outer locknut (4) and the inner locknut (5) against loosening increases significantly, especially for systems exposed to high vibration (FIGS. 5, 6).

Figure 7:
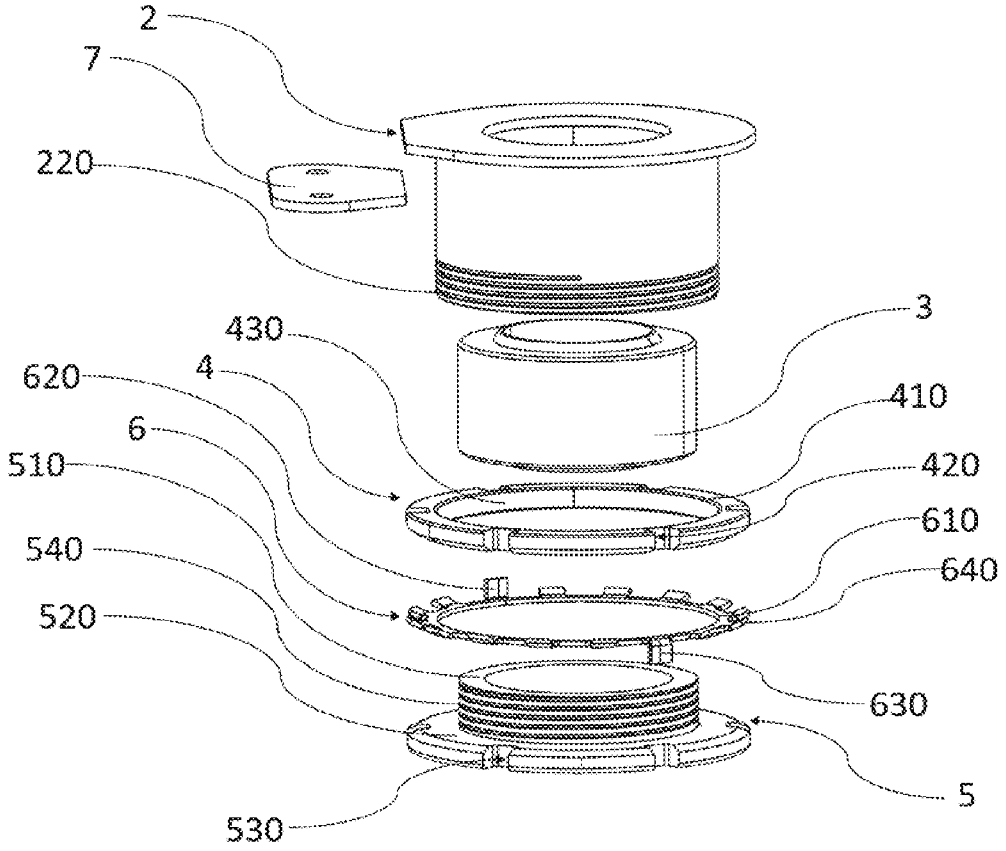
FIG. 7 shows the exploded mounting view of a removable bearing holder.
Figure 8:
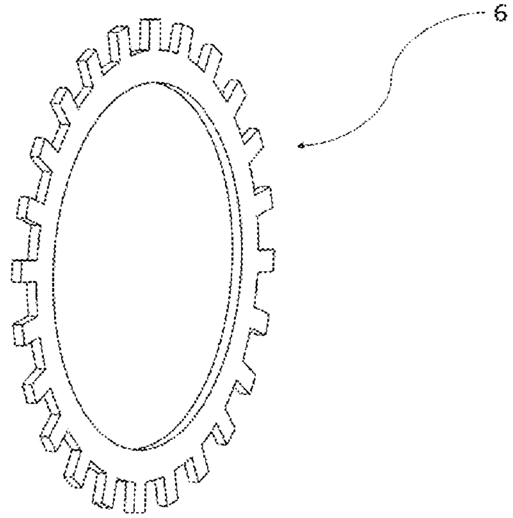
FIG. 8 shows the side view of outer locknut, inner locknut, and washer.
Figure 9:
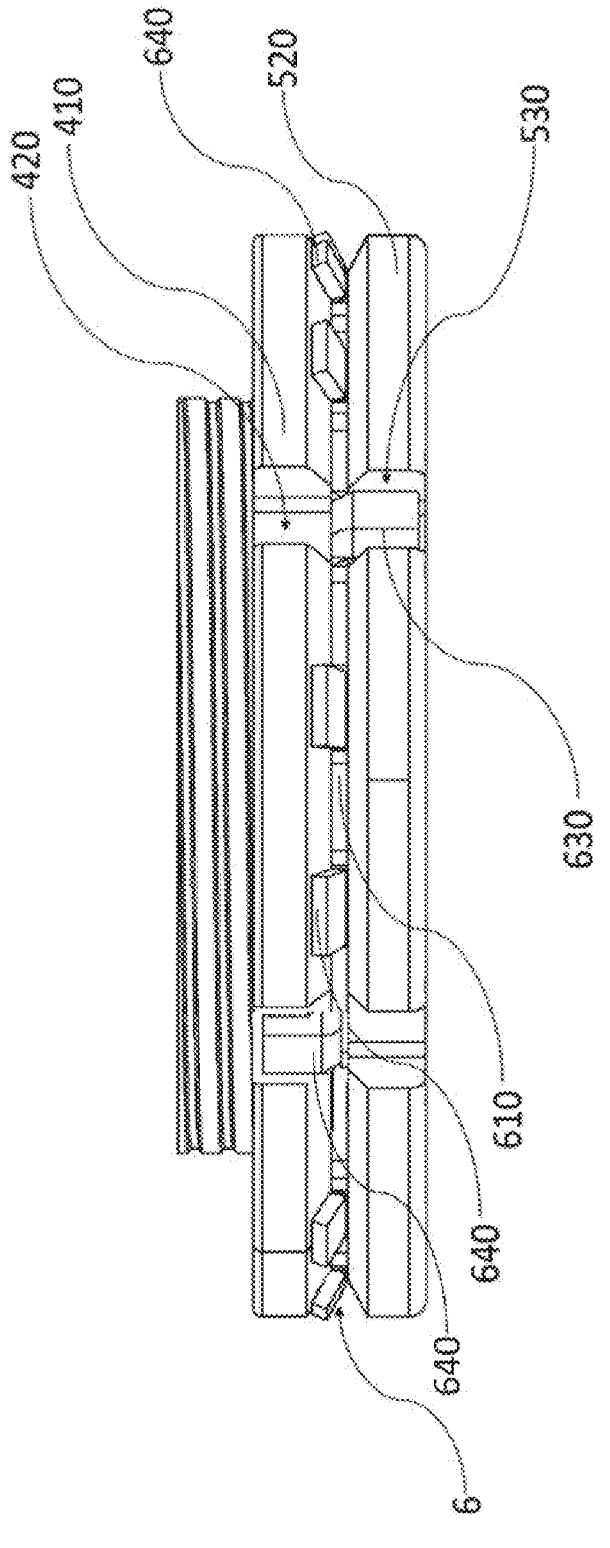
FIG. 9 shows a perspective view of a removable bearing holder

In one embodiment of the invention, the removable bearing holder (1) comprises an outer locknut main body (410) that is located on the outer locknut (4) in the form of a ring, a plurality of outer locknut slots (420) having grooves spaced equally around the outer locknut main body (410), an inner locknut cylindrical part (510) which is almost completely hollow cylindrical in shape and is located on the inner locknut (5), an inner locknut flange (520) extending outward from the inner locknut cylindrical portion (510) forming a protrusion form, a plurality of inner locknut slots (530), which are grooves spaced equally around the inner locknut flange (520), a washer main body (610) that is located on the washer (6) and is almost completely in the form of a ring, more than one washer outer nut protrusion (620) that are located at almost equal intervals around the washer (6), extend outwards from the washer main body (610) and form a protrusion form, and enter the outer locknut slot (420) by bending, and a washer inner nut protrusion (630) that is located at almost equal intervals around the washer (6), extends outwards from the washer main body (610) and forms a protrusion form, has a distance between it and the washer outer nut protrusion (620), and is bent by the manufacturer to fit into the inner locknut slot (530). The washer outer nut protrusion (620) and the washer inner nut protrusion (630) ensure that the rotational movement and forces due to loosening of the outer locknut (4) and the inner locknut (5) are transferred to each other, respectively. The washer outer nut protrusion (620) and the washer inner nut protrusion (630) are equally spaced circumferentially/radially around the axis of the washer (6). For the required number of the washer outer nut protrusion (620) and the washer inner nut protrusion (630), manufacturers divide three hundred and sixty degrees by the number of the washer outer nut protrusion (620) and the washer inner nut protrusion (630) they prefer and determine how many degrees of equal intervals the washer outer nut protrusion (620) and the washer inner nut protrusion (630) should be positioned on the washer (6). (FIGS. 7, 8, 9).

In an embodiment of the invention, the removable bearing holder (1) comprises an outer locknut thread (430) that has helical recesses on the wall facing the gap (H) of the outer locknut main body (410), is removably attached to the body outer thread (220) by rotating it around itself in, and has helical recesses in a clockwise or counterclockwise direction, and an inner locknut thread (540) that consists of helical recesses on the wall of the inner locknut cylindrical part (510) facing the body (2), and has helical recesses in the opposite direction to the thread direction of the outer locknut thread (430). The fact that the thread directions of the outer locknut threads (430) and the inner locknut threads (540) are opposite to each other ensures that the outer locknut threads (430) and the inner locknut threads (540) will have a compensating effect on each other when they become loose, especially under operating conditions where the system is exposed to vibration. When either the outer locknut thread (430) or the inner locknut thread (540) starts to loosen, the loosening effect will create a tightening effect on the other, thus preventing the outer locknut (4) and inner locknut (5) from loosening (FIG. 6).

In an embodiment of the invention, the removable bearing holder (1) comprises a first position (I) where the washer outer nut protrusion (620) and the washer inner nut protrusion (630) extend almost completely parallel to the washer main body (610) and there is a distance between them and the outer locknut slot (420) and the inner locknut slot (530); a second position (II) where the washer outer nut protrusion (620) and the washer inner nut protrusion (630) are opposite each other and twist into the outer locknut slot (420) and the inner locknut slot (530); and the bearing (3) which is in the second position (II) during the operation of the aircraft. In the first position (I), the outer nut protrusion (620) and the inner nut protrusion (630) of the washer extend parallel to the main body of the washer. In the first position (I), the outer nut protrusion (620) and the inner nut protrusion (630) of the washer are brought to the second position (II) by performing the relevant bending operations by the manufacturer in order to be mounted. In the second position (II), the outer nut protrusion (620) and the inner nut protrusion (630) are bent and are attached to the outer locknut slot (420) and the inner locknut slot (530), respectively. The second position (II) is the position where the removable bearing holder (I) is functionally working and active (FIGS. 7, 8, 9).

In one embodiment of the invention, the removable bearing holder (1) comprises more than one washer Intermediate protrusion (640) that are located on the washer (6), and are bent in a curved manner towards the outer locknut main body (410) in the second position (II), thus creating an extra friction force between the outer locknut (4) and the inner locknut (5) and thereby creating a precaution against loosening. The washer Intermediate protrusions (640) ensure that extra friction occurs between the outer locknut (4) and the inner locknut (5) and reduce the possibility of loosening (FIGS. 7, 9).

In one embodiment of the invention, the removable bearing holder (1) comprises an outer thread (220) consisting of helical recesses at the other end of the body cylindrical part (210) facing the body (D), and an inner thread (230) consisting of helical recesses at the other end of the body cylindrical part (210) facing the body (D). The body outer thread (220) and the body inner thread (230) are connected to each other by the outer locknut thread (430) and the inner locknut thread (540) respectively, by rotating in a removable manner (FIG. 7).

In one embodiment of the invention, the removable bearing holder (1) comprises a washer outer nut protrusion (620) that is located at intervals between the inner locknut slots (530) located one after the other all around, is almost completely in contact with the outer locknut main body (410) and the inner locknut flange (520), thus provides additional friction. The inner locknut slots (530) are equally spaced around the axis of the inner locknut (5) (FIG. 7).

In one embodiment of the invention, the removable bearing holder (1) comprises a body inner flange (240) that is located on the body (D) side of the body cylindrical part (210), is a protrusion extending towards the gap (H), is at least partially in contact with the bearing (3) and enables the bearing (3) to be fixed. The body inner flange (240) prevents the bearing (3) from coming out of the gap (H) and contributes to the effective operation of the bearing (3) (FIG. 6).

In one embodiment of the invention, the removable bearing holder (1) comprises a body outer flange (250) that is located on the body (2), is mounted on the body (D), extends outward from the body (2) and forms a protrusion form. The body outer flange (250) is located on the body (D) (FIG. 6).

In one embodiment of the invention, the removable bearing holder (1) comprises a body (D) that allows the bearing (3) to be mounted in a removable manner by fitting the bearing (3) into the gap (H), rotating the outer locknut thread (430) onto the body outer thread (220), placing the bearing (3) onto the body inner flange (240), mounting the washer (6) onto the outer locknut (4), rotating the inner locknut thread (540) onto the body inner thread (230), folding the outer nut projection (620) and the inner nut projection (630) of the washer onto the outer locknut slot (420) and the inner locknut slot (530) where they are opposite each other (FIG. 7).

Figure 3:
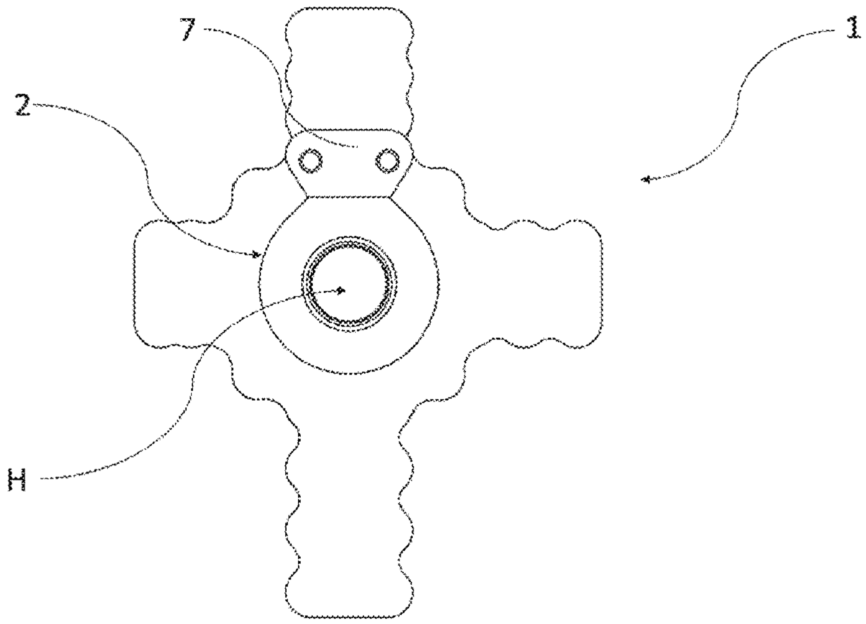
FIG. 3 shows the top view of a removable bearing holder.
Figure 4:
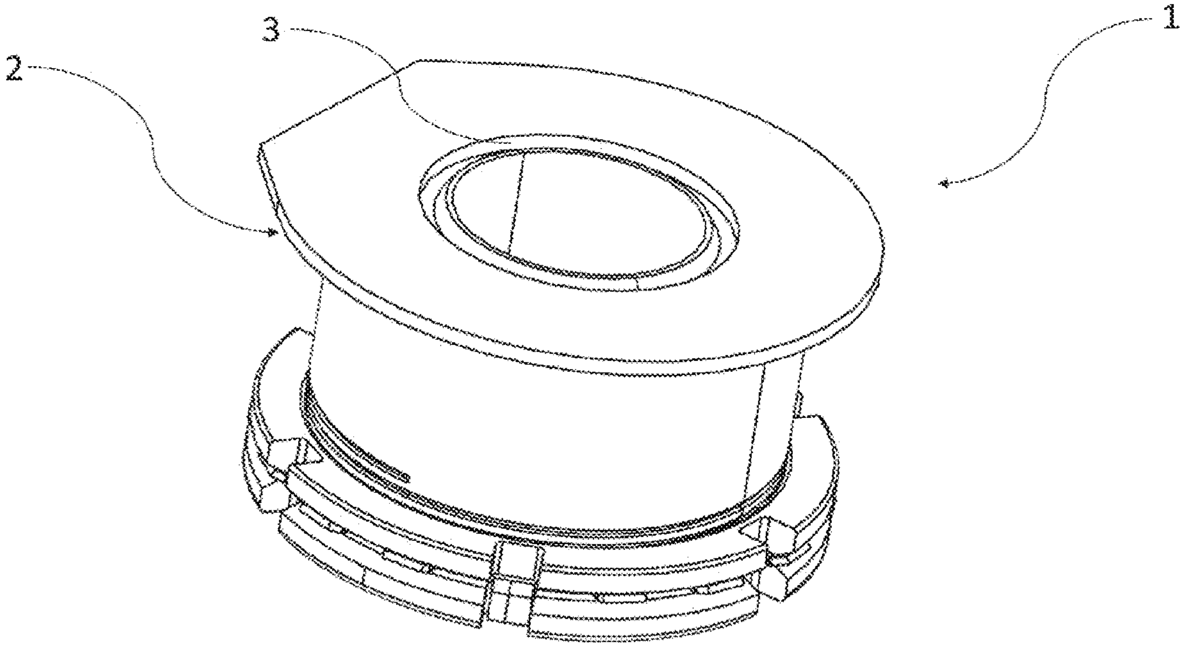
FIG. 4 shows the perspective view of body, bearing, inner locknut, outer locknut, and washer.

In one embodiment of the invention, the removable bearing holder (1) comprises at least one limiter (7) that prevents the body (2) from rotating around itself, is located on the body (D) and is form-compatible with the body outer flange (250). The limiter (7) ensures that the body (2) is held securely in the gap (H) and on the body (D) by applying a torque in the opposite direction to the rotation tendency of the body (2), especially in high vibration environments (FIGS. 3, 7).

In one embodiment of the invention, the removable bearing holder (1) comprises the body outer flange (250) in a chamfered form. The chamfered form of the body outer flange (250) facilitates the mounting of the body (2) to the body (D) (FIG. 7).

In one embodiment of the invention, the removable bearing holder (1) comprises the body cylindrical part (210) that is attached to the body (D) with a gap-fit mounting relationship in the gap (H). The clearance fit relationship ensures easy mounting and effective operation of the body (2) on the body (D) (FIG. 7).

The invention claimed is:

1. A removable bearing holder comprising:

a body (D);

a gap (H) that is an opening in the body (D);

a body that is cylindrical in form, is located inside the gap (H), and is form-compatible with the body (D);

a body cylindrical part which is a part of the body that is hollow cylindrical in form;

a bearing that is located inside the gap (H) and is mounted on the body cylindrical part in a way that the bearing comes into contact with the body cylindrical part all around;

at least one body outer thread having helical recesses on an outer wall of the body cylindrical part;

an outer locknut having helical recesses mounted on the body outer thread in a removable manner by rotating the outer locknut;

at least one body inner thread having helical recesses located on an inner wall of the body cylindrical part;

an inner locknut having helical recesses facing and attached to the helical recesses of the body inner thread in a removable manner by rotating the inner locknut, thereby fixing the bearing in the direction in which the gap (H) extends; and at least one washer in the form of a ring located between the outer locknut and the inner locknut.

2. The removable bearing holder according to claim 1, wherein:

the outer locknut comprises an outer locknut main body in the form of a ring and a plurality of outer locknut slots having grooves spaced equally around the outer locknut main body;

the inner locknut comprises an inner locknut cylindrical part that is hollow cylindrical in shape, an inner locknut flange extending outward from the inner locknut cylindrical part and forming a protrusion form, and a plurality of inner locknut slots that are grooves spaced equally around the inner locknut flange; and the washer comprises a washer main body in the form of a ring, more than one washer outer nut protrusion located at equal intervals around the washer, extending outward from the washer main body, forming a protrusion form, and entering the outer locknut slots by bending, and more than one washer inner nut protrusion located at equal intervals around the washer, extending outward from the washer main body, forming a protrusion form, spaced a distance from the more than one washer outer nut protrusion, and bent to fit into the inner locknut slots.

3. The removable bearing holder according to claim 2, wherein an outer locknut thread consists of helical recesses on a wall of the outer locknut facing the gap (H), the helical recesses of the outer locknut thread having a clockwise or counterclockwise direction, and an inner locknut thread consists of helical recesses on a wall of the inner locknut cylindrical part facing the body cylindrical part, the helical recesses of the inner locknut thread being in a direction opposite to the direction of the helical recesses of the outer locknut thread.

4. The removable bearing holder according to claim 2, wherein the more than one washer outer nut protrusion and the more than one washer inner nut protrusion are bendable between:

a first position (I), in which the more than one washer outer nut protrusion and the more than one washer inner nut protrusion extend parallel to the washer main body and are spaced apart from the outer locknut slots and the inner locknut slots, respectively; and a second position (II), in which the more than one washer outer nut protrusion is bent into the outer locknut slots and the more than one washer inner nut protrusion is bent into the inner locknut slots, wherein the more than one washer outer nut protrusion and the more than one washer inner nut protrusion are in the second position (II) during operation of the aircraft.

5. The removable bearing holder according to claim 4, wherein the washer further comprises more than one washer intermediate protrusion located on the washer and, in the second position (II), bent toward and in contact with the outer locknut main body.

6. The removable bearing holder according to claim 2, wherein the more than one washer outer nut protrusion is in contact with the outer locknut main body and the inner locknut flange so as to provide additional friction.

7. The removable bearing holder according to claim 1, wherein the body outer thread consists of the helical recesses at an end of the body cylindrical part facing the body (D), and the body inner thread consists of the helical recesses at the end of the body cylindrical part facing the body (D).

8. The removable bearing holder according to claim 1, wherein a body inner flange is located on a body (D) side of the body cylindrical part, is a protrusion extending toward the gap (H), and is at least partially in contact with the bearing so as to fix the bearing.

9. The removable bearing holder according to claim 1, wherein a body outer flange is located on the body cylindrical part, is mounted on the body (D), extends outward from the body cylindrical part, and forms a protrusion form.

10. The removable bearing holder according to claim 9, wherein the body (D) allows the bearing to be mounted in a removable manner by:

fitting the bearing into the gap (H);

rotating the outer locknut thread onto the body outer thread;

placing the bearing onto the body inner flange;

mounting the washer onto the outer locknut;

rotating the inner locknut thread onto the body inner thread; and folding the washer outer nut protrusion and the washer inner nut protrusion into the outer locknut slot and the inner locknut slot, respectively, where they are opposite each other.

11. The removable bearing holder according to claim 9, wherein at least one limiter prevents the body cylindrical part from rotating with respect to the body (D), is located on the body (D), and is form-compatible with the body outer flange.

12. The removable bearing holder according to claim 9, wherein the body outer flange is in a chamfered form.

13. The removable bearing holder according to claim 1, wherein the body cylindrical part is attached to the body (D) with a clearance fit relationship in the gap (H).

* * * * *